United States Patent

[11] 3,552,572

| [72] | Inventor | Cleophas L. Lehmann |
| --- | --- | --- |
| | | 1123 6th Ave. S. E., Aberdeen, S. Dak. 57401 |
| [21] | Appl. No. | 746,926 |
| [22] | Filed | July 23, 1968 |
| [45] | Patented | Jan. 5, 1971 |

[54] SEDIMENT TRAP
10 Claims, 3 Drawing Figs.

[52] U.S. Cl. .................................................. 210/271, 210/290
[51] Int. Cl. ................................................ B01d 29/38
[50] Field of Search ........................................ 210/80, 81, 269—271, 273—277, 279, 290

[56] References Cited
UNITED STATES PATENTS

| 222,731 | 12/1879 | Peterson.......................... | 210/290X |
| 484,781 | 10/1892 | Deutsch ......................... | 210/279X |
| 590,868 | 9/1897 | Wanner, Jr. et al........... | 210/290X |
| 2,199,891 | 5/1940 | Martin............................ | 210/275X |
| 3,278,034 | 10/1966 | West .............................. | 210/275X |

Primary Examiner—Samih N. Zaharna
Attorneys—Clarence A. O'Brien and Harvey B. Jacobson ABSTRACT: A sediment trap whose cleaning operation involves a siphoning action to be used on the surface of the filter bed to draw off accumulated silt and solids without disturbing the stratified layers of the filtering bed.

PATENTED JAN 5 1971 3,552,572
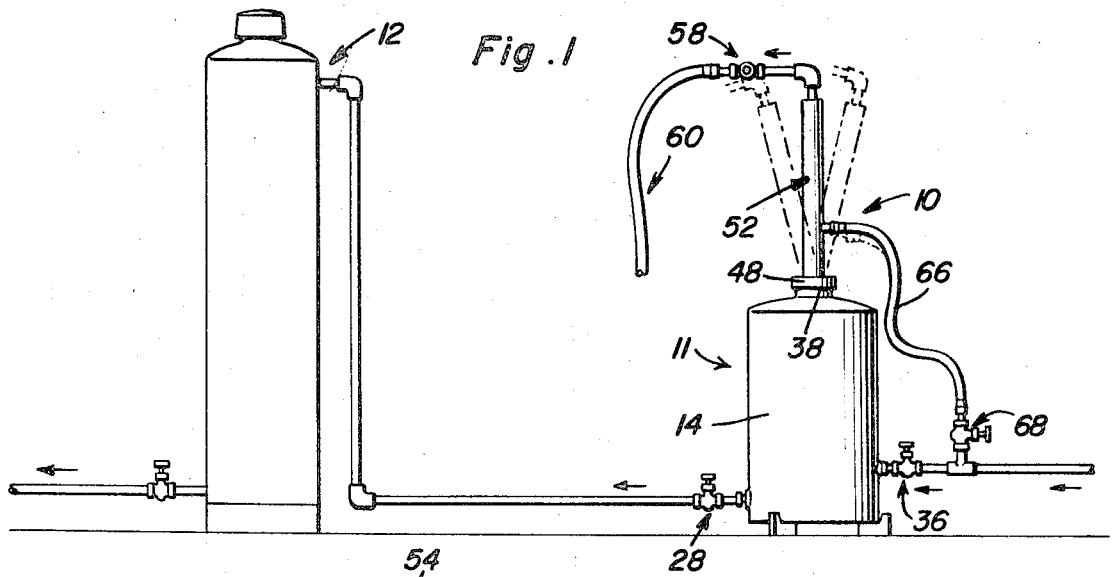
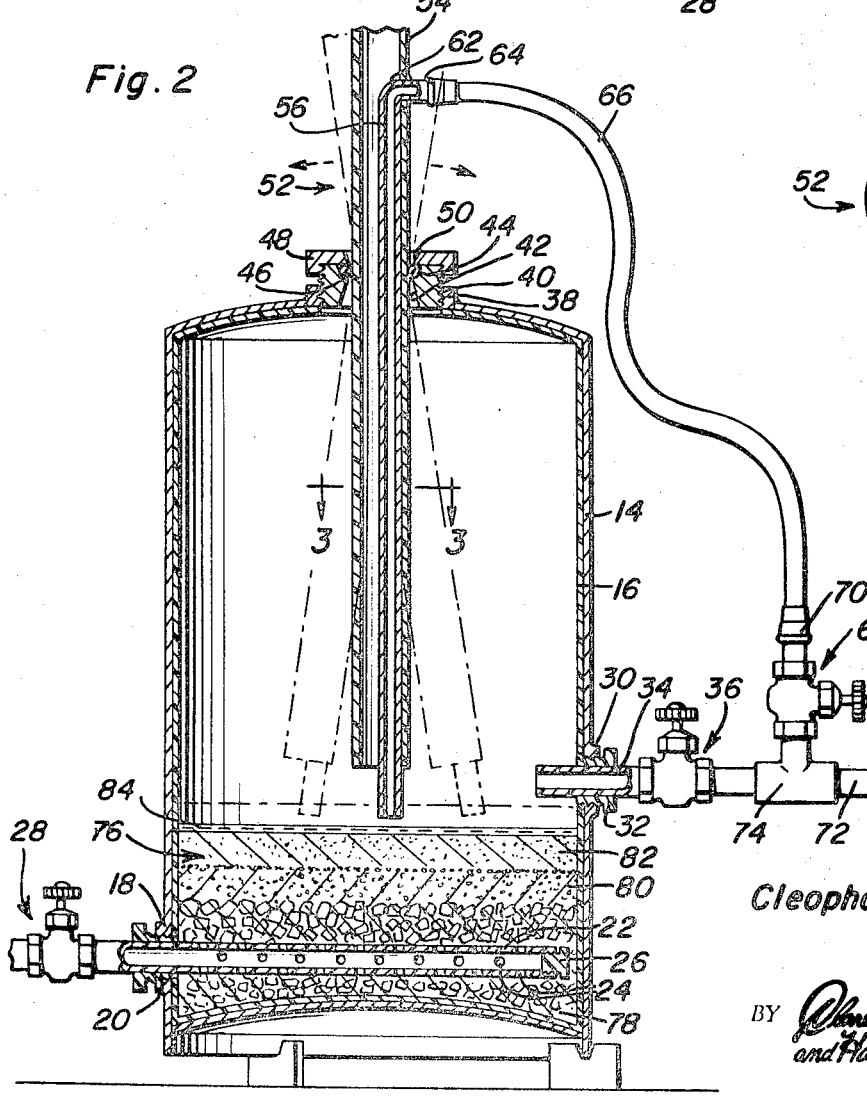
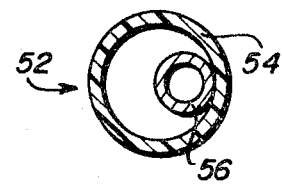
Cleophas L. Lehmann
INVENTOR.
BY Clarence A. O'Brien
and Harvey B. Jacobson
Attorneys

SEDIMENT TRAP

The present invention relates to a sediment trap for water. Conventionally, water is put into a tank which has a stratified filter bed in the bottom thereof. The finest or smallest aggregate layer being at the surface of the bed and the coarsest or largest aggregate layer being on the bottom of the bed. The water seeps through the bed leaving behind, at the surface thereof, silt or solids removed from the water. The outlet of the tank is in the coarsest layer in the bottom of the bed where the clean water is drawn off. Heretofore, to clean such traps the water flow was reversed to lift the accumulated sediment off the top of the filter bed and flush it out the inlet pipe or other outlet provided for such use. This procedure usually disturbed the stratified layers of the bed so that when the different aggregates settled out after flushing they were thoroughly mixed and the effectiveness of the bed was destroyed. The cleaning operation of the present invention provides a siphon action cleaning tube to clean the accumulated sediment off the top of the filter bed. The suction force on the siphon can be varied with the water pressure so that all of the sediment can be removed without disturbing the filter bed, or if desired, one or more layers of the bed can be removed and replaced. This provides a versatility in such sediment traps that has not heretofore been available.

It is therefore an object of the invention to provide a sediment trap with a simple and unique cleaning apparatus.

It is a further object of the invention to provide a sediment trap whose efficiency is maintained after prolonged use.

It is a further object of the invention to provide a sediment trap with a siphon action cleaning operation that does not disturb the stratified layers of the filter bed.

It is a still further object of the invention to provide a sediment trap whereby repeated cleaning does not diminish the efficiency of the filter bed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side view of the device connected in series with a water softener.

FIG. 2 is an enlarged section view of the subject sediment trap.

FIG. 3 is a section view taken substantially along the line 3—3 of FIG. 2.

Referring now to the drawings, reference numeral 10 refers generally to the subject siphon cleaning device for a sediment trap, reference numeral 11 generally designates a sediment trap, and the numeral 12 refers generally to a water softener, showing a typical installation in FIG. 1. The sediment trap 11 has an outside shell or protective layer 14 and an interior tank or liner 16 made of plastic or other appropriate noncorrosive material. An outlet boss 18 is located near the bottom of the trap on the shell 14 and has interior threads thereon which receive a bushing 20 that sealingly threads into the boss and communicates with the interior of the tank 16. An outlet tube 22, with perforations 24 therein, is received through the bushing 20 into the interior of the tank 16. The tube is closed at one end by a plug 26 and is of sufficient length to extend across the diameter of the tank. Due to the structure of the bushing 20 and the uniform outside diameter of the outlet tube, the tube may be removed through the bushing 20 for cleaning or replacement. An outlet valve 28 is located on the imperforate end of tube 22 that extends beyond the bushing 20 on the exterior of the trap. The outlet valve 28 closes off the sediment trap outlet during the cleaning operation.

An inlet boss 30 is located on the circumference of the trap at a height placing it above a fine or top layer of the stratified filter bed. The boss 30 has interior threads thereon which receive a threaded bushing 32 that sealingly engages the threads of the boss and communicates with the interior of the tank 16. An inlet tube 34 is sealingly received through the bushing 32 into the interior of the tank 16 with an inlet valve 36 provided thereon to shut off the water during cleaning.

A clean boss 38, with interior threads therein, is located at the top of the trap on the shell 14. The boss 38 receives a threaded bushing 40 therethrough which seals on and communicates with the interior of the tank 16. An opening 42 through bushing 40 has a generally ascending frustoconical cross section which terminates in an annular seat 44 of semicircular cross section. A rubber O-ring 46 is seated on seat 44 and compressed thereagainst by cap 48 which is threadedly received on the end of bushing 40. An opening 50 through the cap 48 has a generally descending frustoconical cross section like that of opening 42 which leaves a substantial inner diameter of the O-ring 46 exposed. A cleaning tube 52 has an outside diameter slightly larger than the exposed inner diameter of O-ring 46 and is sealingly received therethrough. The conical openings 42 and 50 below and above the O-ring, respectively, allow the tube 52 to be oscillated about a pivot point defined by the O-ring. The cleaning tube 52 may also be inserted or removed past the resilient O-ring 46. The cleaning tube 52 has a larger outside pipe 54 and a smaller inside pipe 56 affixed to the inside of pipe 54, see FIG. 3. The outside pipe 54 is closed at its end remote from the trap by any suitable means which includes a flush shutoff valve 58, which is open during the cleaning operation, and closed during the normal use of the trap. The flexible conduit or hose 60 provides a convenient means to direct the wash water to a suitable drain. The inner pipe 56 ends, exteriorly of the boss and cap assembly, in an elbow 62 which extends through and seals with the outer pipe 54 and terminates in a threaded end or nipple 64. A flexible conduit or hose 66 is connected at the nipple 64 and extends to a flush inlet valve 68 and is connected thereto by a nipple 70. The valve 68 is connected to the main water supply 72 by any convenient means, for example by the "T" 74, and controls the flow of water to the cleaning siphon 10.

In the filter bed 76 of the trap is a series of graduated layers of aggregate in the bottom of tank 16. The coarsest aggregate 78, usually a gravel, fills the bottom of the tank to a point above the outlet tube 22. There may be a number of intermediate layers of aggregate 80 which gradually reduce in size to the topmost layer 82, which is the smallest aggregate size, which is usually a sharp sand. This top layer 82 ends somewhat below the water inlet tube 34 to insure that the incoming water will filter through all of the layers of the filter bed 76. Since silt and other sediment will not penetrate the sharp sand or top layer 82 of the bed, the silt will accumulate on top of the bed. When the silt reaches a level that reduces the efficiency of the trap, the valves 36 and 28 are shut off thereby stopping the normal flow of water therethrough, and the valves 58 and 68 are than opened which directs the water through hose 66 and down pipe 56 and into the tank 16. Since there is no other outlet for the water thus admitted into the tank, it will travel up the pipe 54 in a siphoning action. This will draw up any silt or sediment laying on top of the filter bed and flush it out the hose 60. The mounting of the pipe, as above set forth, in O-ring 46 permits the pipe to be oscillated, as shown in phantom in FIG. 2, and thereby clean the entire surface of the bed. In use it is found to be beneficial to leave a thin layer of silt 84 on the top of the bed to further improve the efficiency of the filter bed. A thin layer of silt 84 adds its own minute size aggregate to the filter bed, while a heavy layer or buildup thereof reduces the flow through the bed and requires cleaning. By increasing the flow of water through the siphon apparatus 10 during the cleaning operation and/or moving the siphon 10 down into the tank 16, a layer or layers of the bed may be removed by the siphoning action, and then subsequently replaced with fresh aggregate. Also, the cleaning tube 52, outlet tube 22, and the inlet tube 34 may be replaced without dismantling or replacing the whole or any other part of the sediment trap.

This versatility and ease of operation have been heretofore unknown in the filter bed type of sediment trap. The flushing and draining of silt and sediment can be expanded to remove a layer or layers of the bed without dismantling. This elimination of the need to dismantle the tank to replace aggregate allows the use of a seamless noncorrosive tank which is more economical and long lasting than a sectional tank which uses gaskets between the sections. The apparatus heretofore available required a reversal of the flow of water through the filter bed which either: disturbed and mixed the various layers of the bed or the flow of water channeled a path through the bed to the outlet. Both of the above results of the flow reversal cleaning method destroyed the efficiency of the filter bed which then required its complete removal and replacement which also meant a dismantling of the tank assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A sediment trap and cleaning apparatus thereof, comprising: a tank assembly, a water supply, filter means in said tank, an inlet to admit water to said tank and through said filter means, a water outlet to release the water after flowing through said filter means, means to close the inlet and outlet, means when said inlet and outlet are closed to wash the filter means and siphon off said water used to wash the filter means, said means to wash the filter being mounted on said tank and extending therein, including an inlet pipe to carry water into the interior of said tank and an outlet pipe associated therewith to siphon the water out, said inlet pipe being fixed on the inside surface of said outlet pipe, said pipes being thereby coextensive, means mounting said outlet pipe through a wall of said tank opposing the upstream side of said filter means for rotary oscillation of the coextensive pipes and insertion or withdrawal thereof in relation to said tank wall.

2. The device of claim 1 wherein the filter means is a series of layers of different size aggregate in the bottom of the tank.

3. The device of claim 2 wherein the layers of aggregate begin with the coarsest layer on the bottom of the tank and ascend upward to the finest layer at the top of the filter means.

4. The device of claim 3 wherein the outlet is in the coarsest layer of the filter and the inlet is above the surface of the finest layer of the filter.

5. The device of claim 1 wherein the means to close the inlet comprises a shut off valve.

6. The device of claim 5 wherein the means to close the outlet comprises a shut off valve.

7. In combination, a filter tank including a fluid inlet and a fluid outlet, fluid filtering media disposed in the path of movement of fluid through said tank from said inlet to said outlet, an outlet pipe for removing from said tank solid particles separated by said media, support means mounting said outlet pipe through a wall portion of said tank constructed and arranged to permit angular displacement of said pipe relative to said tank wall portion, the inlet end of said pipe disposed within said tank, upon angular displacement of said pipe, being movable into close proximity with and swingable over at least a large portion of the upstream side of said filter media, and wash water means for said filtering media including an outlet end adjacent and supported for movement with the inlet end of said outlet pipe and operable to discharge a stream of water therefrom onto those portions of the upstream side of said filter media with which the inlet end of said outlet pipe is moved into close proximity.

8. The combination of claim 7 wherein said support means includes means mounting said outlet pipe for longitudinal shifting relative to said tank wall.

9. The combination of claim 7 wherein said wash water means includes a supplemental water inlet pipe extending through said outlet pipe and including an outlet end spaced slightly outward of the inlet end of said outlet pipe.

10. The combination of claim 7 wherein said support means includes means establishing a fluid tight seal between the external surface of said outlet pipe and said tank wall.